United States Patent [19]
Badesha et al.

[11] Patent Number: 5,744,200
[45] Date of Patent: Apr. 28, 1998

[54] VOLUME GRAFTED ELASTOMER SURFACES AND METHODS THEREOF

[75] Inventors: Santokh S. Badesha, Pittsford; George J. Heeks, Rochester; Arnold W. Henry, Pittsford, all of N.Y.

[73] Assignee: Xerox Corporation, Stamford, Conn.

[21] Appl. No.: 625,563

[22] Filed: Mar. 28, 1996

[51] Int. Cl.$^6$ .................................................. B05D 3/02
[52] U.S. Cl. .................... 427/387; 427/388.2; 427/388.5
[58] Field of Search ................... 427/387, 388.1, 427/388.2, 388.5, 409

[56] References Cited

U.S. PATENT DOCUMENTS

| | | | |
|---|---|---|---|
| 4,853,737 | 8/1989 | Hartley et al. | 355/289 |
| 5,166,031 | 11/1992 | Badesha et al. | 430/124 |
| 5,217,837 | 6/1993 | Henry et al. | 430/124 |
| 5,281,506 | 1/1994 | Badesha et al. | 430/124 |
| 5,332,641 | 7/1994 | Finn et al. | 430/124 |
| 5,337,129 | 8/1994 | Badesha | 355/275 |
| 5,340,679 | 8/1994 | Badesha et al. | 430/126 |
| 5,366,772 | 11/1994 | Badesha et al. | 428/35.8 |
| 5,370,931 | 12/1994 | Fratangelo | 428/334 |
| 5,456,987 | 10/1995 | Badesha | 428/421 |

*Primary Examiner*—Erma Cameron
*Attorney, Agent, or Firm*—Annette L. Bade

[57] ABSTRACT

Volume grafted elastomer surfaces and a method for providing a volume grafted elastomer surface on a supporting substrate which includes dissolving a fluoroelastomer in a solvent, adding a nucleophilic dehydrofluorinating agent, preferably an amino silane which acts as both a dehydrofluorinating agent and curing agent, a polymerization initiator and a polyorganosiloxane in amounts sufficient to effect formation of a volume graft elastomer, optionally adding an additional amount of amino silane as a curative in order to ensure complete curing of the volume grafted elastomer, and subsequently providing a layer of the homogeneous volume grafted elastomer solution to the supporting substrate are provided herein.

15 Claims, 1 Drawing Sheet

VOLUME GRAFTED ELASTOMER SURFACES AND METHODS THEREOF

CROSS REFERENCE TO RELATED APPLICATIONS

Attention is directed to the following copending applications assigned to the assignee of the present application: Attorney Docket Number D/94318 U.S. application Ser. No. 08/623,290 filed Mar. 28, 1996, entitled, "Fluoroelastomer Surfaces and Methods Thereof," Attorney Docket No. D/94319 U.S. application Ser. No. 08/623,292 filed Mar. 28, 1996, entitled, "Fluoroelastomer Surfaces and Methods Thereof," Attorney Docket No. D/94356 U.S. application Ser. No. 08/625,566 filed Mar. 28, 1996, entitled, "Fluoroelastomer Members," and Attorney Docket No. D/943560 U.S. application Ser. No. 08/623,273 filed Mar. 28, 1996 entitled, "Fluoroelastomer Members." The disclosures of these applications are hereby incorporated by reference in their entirety.

BACKGROUND OF THE INVENTION

The present invention relates to elastomer surfaces and a process for providing an elastomer surface, and more specifically a volume graft elastomer surface, on a supporting substrate. The resulting surfaces are useful as surfaces for components in electrostatographic processes, especially xerographic processes, including the surfaces of donor rolls, pressure rolls, fuser rolls, toner transfer belts or roller surfaces and the like. In embodiments, the present invention allows for a decrease in unit manufacturing costs by dispensing with the need for additional coupling and crosslinking agents during the curing process in the overall process for providing a volume grafted elastomer surface. Further, with the present process, the final ball milling step is not necessary, resulting in decreased time required for curing and further, resulting in a decrease in cost. The resulting volume grafted elastomer surface has sufficient toughness and increased chemical, physical and thermal stability when compared to surfaces cured using known methods.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into a fire, at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affects the fusing of the toner image onto the support. It is important in the fusing process that no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Particularly preferred fusing systems are comprised of a heated cylindrical fuser roll having a fusing surface which is backed by a cylindrical pressure roll forming a fusing nip therebetween. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in an electrostatographic printing system.

In U.S. Pat. No. 5,166,031, the disclosure of which is herein incorporated by reference in its entirety, there is illustrated a fuser member comprising a supporting substrate having an outer layer of a volume grafted elastomer which is a substantially uniform integral interpenetrating network of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator, and wherein the fluoroelastomer can be selected from a group consisting of poly(vinylidene fluoride-hexafluoropropylene) and poly(-vinylidene fluoride-hexafluoropropylene-tetrafluoroethylene).

U.S. Pat. No. 5,281,506, the disclosure of which is herein incorporated by reference in its entirety, discloses a method of fusing a thermoplastic resin toner image to a substrate comprising forming a film of a polymeric release agent on the surface of a heated fuser member, said fuser member comprising a supporting substrate having an outer layer of a cured fluoroelastomer and having a thin surface layer of a polyorganosiloxane having been grafted to the surface of the cured fluoroelastomer in the presence of a dehydrofluorination initiator for the fluoroelastomer and from a polyorganosiloxane having reactive functionality.

U.S. Pat. No. 5,366,772, the disclosure of which is herein incorporated by reference in its entirety, describes an outer layer of a fuser member comprised of a substantially uniform integral interpenetrating hybrid polymeric network comprised of a haloelastomer, a coupling agent, a functional polyorganosiloxane and a crosslinking agent. The hybrid polymeric network is formed by the sequential reaction of the haloelastomer with a dehydrohalogenating agent, reaction with the coupling agent, condensation with the functional polyorganosiloxane, and crosslinking with the crosslinking agent.

U.S. Pat. No. 5,370,931, the disclosure of which is herein incorporated by reference in its entirety, describes a grafted elastomer which is a substantially uniform integral interpenetrating network of a hybrid composition of a fluoroelastomer and a polyorganosiloxane, said graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator; and wherein said outer layer contains copper oxide in an amount of from 2 to 7 weight percent based upon the total weight of said outer layer.

Generally, the process for providing the elastomer surface on the supporting substrate, e.g., donor roll, pressure roll, fuser roll, toner transfer belt or roller surfaces, etc., includes dissolving the fluoroelastomer in a typical solvent, followed by addition of a dehydrofluorination agent, a polymerization initiator and polyorganosiloxane, in order to form a volume graft polymer. Next, a nucleophilic curing agent which incorporates an accelerator and a crosslinking agent is added, followed by addition of the basic metal oxides in particulate form followed by ball milling the reaction mixture for extended period of time resulting in the formation of fine dispersion which is then used to fabricate the elastomer surfaces by conventional fabrication techniques. After the elastomer is provided on the substrate, the substrate is subjected to a step heat curing process.

The curing step can be considered an essential part of the preparation of volume grafted elastomers surfaces. The level of cure is very important in that it affects the high temperature stability along with both chemical and physical properties of the elastomers. High temperature stability is crucial for fusing subsystem applications, whereas incomplete curing can adversely affect the transfer efficiencies of liquid and dry toners. Until now, fluoroelastomers have been cured using the above steps, comprising the addition of dehydrofluorinating agents. The dehydrofluorinating agents create double bonds which provide crosslinking cites on the fluoroelastomer. Examples of curing agents include peroxides (for example, bis (2,4-dichlorobenzoyl) peroxide, di-benzoyl peroxide, di-cumyl peroxide, di-tertiary butyl peroxide, and 2,5-dimethyl-2,5-bis (t-butyl peroxy) hexane), diamines, hydrides, oxides, etc. The preferred agents have been the basic metal oxides (MgO and Ca(OH)$_2$) and aliphatic and aromatic amines, where the aromatic groups may be benzene, toluene, naphthalene, anthracene, etc. The particularly preferred curing agents are the nucleophilic curing agents such as VITON CURATIVE VC-50® which incorporates an accelerator (such as a quaternary phosphonium salt or salts) and a crosslinking agent (bisphenol AF) have also been added to crosslink the polyorganosiloxane to the fluoroelastomer. VC-50 is preferred due to the more thermally stable product it provides. The curing step is followed by the ball milling step which lasts anywhere from 2 to 24 hours. The curative component can also be added after ball milling in a solution form. The resulting volume grafted elastomer is provided on a substrate. Normally, step heat curing occurs next by heat curing at about 93° C. for 2 hours, followed by 2 hours at 149° C., 2 hours at 177° C. and 16 hours at 208° C.

Known curing processes such as those listed above require the addition of curing agents and crosslinking agents, in addition to dehydrofluorinating agents such as the basic metal oxides, MgO and Ca(OH)$_2$. These curing and crosslinking agents, along with the basic metal oxides, increase the cost of the curing process immensely. In addition, a roll milling and/or a ball milling step is required in known curing procedures. The ball milling step and the roll milling steps can be extremely costly and time consuming, requiring anywhere from 2 to 24 hours. In addition, the curing procedure must be followed very carefully and in specific detail in order to form volume grafted elastomers with sufficient chemical, physical and thermal stability, along with sufficient toughness.

Therefore, a more cost effective and less time consuming method of providing a volume grafted elastomer surface, which results in elastomers having sufficient toughness as well as sufficient chemical, physical and thermal stability is desired.

SUMMARY OF THE INVENTION

Examples of objects of the present invention include:

It is an object of the present invention to provide electophotographic components and methods with many of the advantages indicated herein.

Further, it is an object of the present invention to provide a volume grafted elastomer surface together with a method for providing the volume grafted elastomer surface on a supporting substrate which does not require the use of additional coupling and crosslinking agents, along with basic metal oxides as the dehydrofluorinating agent.

Another object of the present invention is to provide a volume grafted elastomer surface together with a method for providing the volume grafted elastomer surface on a supporting substrate which does not require the use of a curative which requires redispersing.

It is another object of the present invention to provide a volume grafted elastomer surface together with a method for providing the volume grafted elastomer surface on a supporting substrate which does not require a time consuming and costly ball milling step and/or roll milling step.

It is further an object of the present invention to provide a volume grafted elastomer surface which has sufficient chemical, physical and thermal stability, along with sufficient toughness.

Another object of the present invention is to provide a method for providing a volume grafted elastomer surface on a supporting substrate which is more cost effective than known methods.

Many of the above objects have been met by the present invention, in embodiments, which includes: a method for providing a volume grafted elastomer surface on a supporting substrate comprising: a) dissolving a fluoroelastomer; b) adding an amino silane as a dehydrofluorinating agent and curing agent in an amount of from about 0.5 to about 10 weight percent based on the weight of fluoroelastomer; c) adding a polymerization initiator, a polyorganosiloxane and optionally adding an additional amount of amino silane to form a homogeneous volume graft polymer; d) subsequently providing at least one layer of the homogeneous volume grafted elastomer solution to said supporting substrate.

Embodiments also include: a method for providing a volume grafted elastomer surface on a supporting substrate comprising: a) dissolving a fluoroelastomer; b) adding a dehydrofluorinating agent, a polymerization initiator and a polyorganosiloxane; c) adding and reacting an amino silane in an amount of from about 0.5 to about 10 percent to effect curing, thereby forming a homogeneous volume grafted elastomer; and d) subsequently providing at least one layer of the homogeneous volume grafted elastomer solution to said supporting substrate.

The volume grafted elastomer surface and fuser member with the surface provided by this method, the embodiments of which are further described herein, exhibits sufficient chemical, physical and thermal stability, along with sufficient toughness without the need for additional costly materials such as coupling and crosslinking agents, along with basic metal oxides, and without the time consuming and costly roll milling and/or ball milling steps.

DETAILED DESCRIPTION OF THE PRESENT INVENTION

Figure 1:
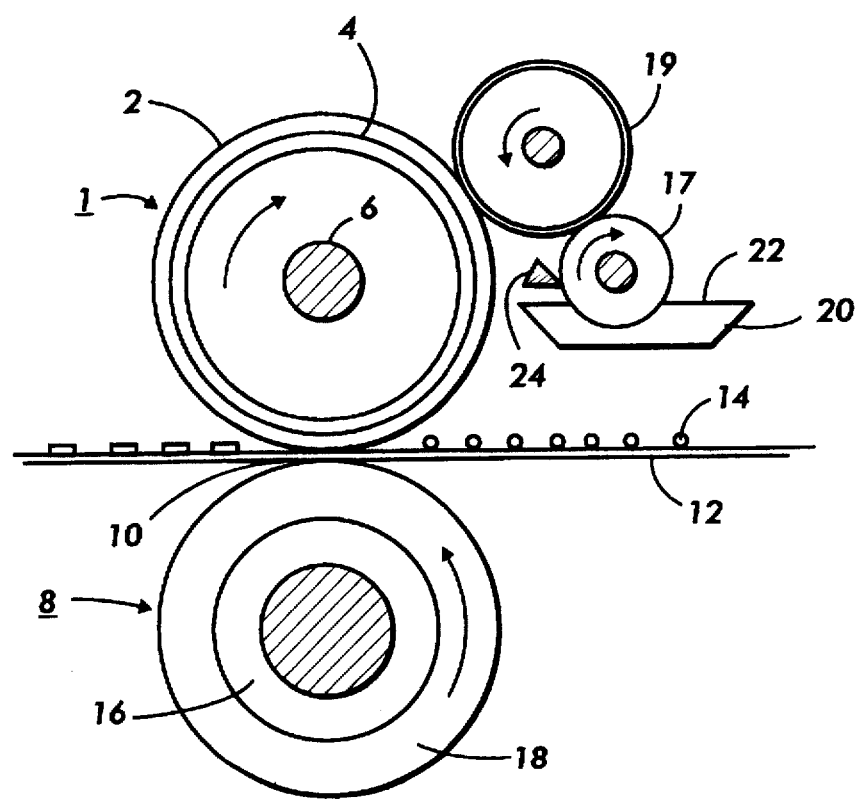
FIG. 1 represents a sectional view of a fuser system with a fuser member of an embodiment of the present invention.

A known fusing system is comprised of a heated cylindrical fuser roll having a fusing surface which is backed by a cylindrical pressure roll forming a fusing nip therebetween. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in an electrostatographic printing system.

The present process, in embodiments, enables surfaces as described in conjunction with a fuser assembly as shown in FIG. 1 where the numeral 1 designates a fuser roll comprising elastomer surface 2 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 to elastomer surface 2. Delivery roll 17 is partly immersed in the sump 20 and transports on its surface release agent from the sump to the delivery roll 19. By using a metering blade 24, a layer of polymeric release fluid can be applied initially to delivery roll 19 and subsequently to elastomer 2 in controlled thickness ranging from submicrometer thickness to thickness of several micrometers of release fluid. Thus, by metering device 24, about 0.1 to 2 micrometers or greater thicknesses of release fluid can be applied to the surface of elastomer 2.

Examples of the fluoroelastomers useful in the practice of the present invention are those described in detail in U.S. Pat. Nos. 5,166,031, 5,281,506, 5,366,772, 5,370,931, 4,257,699, 5,017,432 and 5,061,965, the disclosures of which are incorporated by reference herein in their entireties. As described therein these fluoroelastomers, particularly from the class of copolymers and terpolymers of vinylidenefluoride hexafluoropropylene and tetrafluoroethylene, are known commercially under various designations as VITON A®, VITON B®, VITON E®, VITON E60C®, VITON E430®, VITON 910®, VITON GH® and VITON GF®. The VITON® designation is a Trademark of E.I. Du Pont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company. Some VITON compositions contain small amounts of a bromine terminated olefin as a cure site monomer. This allows for curing with dinucleophiles or peroxides.

In a preferred embodiment, the fluoroelastomer is one having a relatively low quantity of vinylidenefluoride, such as in VITON GF®, available from E.I. Du Pont de Nemours, Inc. The VITON GF® has 35 weight percent of vinylidenefluoride, 34 weight percent of hexafluoropropylene and 29 weight percent of tetrafluoroethylene with 2 weight percent cure site monomer. The amount of fluoroelastomer used to provide the surface of the present invention is dependent on the amount necessary to form the desired thickness of the layer or layers of surface material. Specifically, the fluoroelastomer is added in an amount of from about 1 to about 75 percent, preferably about 5 to about 30 percent by weight.

Examples of surfaces include elastomers of the above type, along with volume grafted elastomers. Volume grafted elastomers are a special form of hydrofluoroelastomer and are substantially uniform integral interpenetrating networks of a hybrid composition of a fluoroelastomer and a polyorganosiloxane, the volume graft having been formed by dehydrofluorination of fluoroelastomer by a nucleophilic dehydrofluorinating agent, followed by addition polymerization by the addition of an alkene or alkyne functionally terminated polyorganosiloxane and a polymerization initiator. The preferred elastomer for surfaces of the present invention are the volume grafted elastomers.

Volume graft, in embodiments, refers to a substantially uniform integral interpenetrating network of a hybrid composition, wherein both the structure and the composition of the fluoroelastomer and polyorganosiloxane are substantially uniform when taken through different slices of the fuser member. A volume grafted elastomer is a hybrid composition of fluoroelastomer and polyorganosiloxane formed by dehydrofluorination of fluoroelastomer by nucleophilic dehydrofluorinating agent followed by addition polymerization by the addition of alkene or alkyne functionally terminated polyorganosiloxane.

Interpenetrating network, in embodiments, refers to the addition polymerization matrix where the fluoroelastomer and polyorganosiloxane polymer strands are intertwined in one another.

Hybrid composition, in embodiments, refers to a volume grafted composition which is comprised of fluoroelastomer and polyorganosiloxane blocks randomly arranged.

Generally, the volume grafting according to the present invention is performed in two steps, the first involves the dehydrofluorination of the fluoroelastomer preferably using an amine. During this step, hydrofluoric acid is eliminated which generates unsaturation, carbon to carbon double bonds, on the fluoroelastomer. The second step is the free radical peroxide induced addition polymerization of the alkene or alkyne terminated polyorganosiloxane with the carbon to carbon double bonds of the fluoroelastomer. In embodiments, copper oxide can be added to a solution containing the graft copolymer. Aminosilane is then added to the solution of graft copolymer. The dispersion is then provided onto the fuser member.

Any known solvent suitable for dissolving a fluoroelastomer may be used in the present invention. Examples of suitable solvents for the present invention include methyl ethyl ketone, methyl isobutyl ketone and the like. The solvent is used in an amount sufficient to dissolve the fluoroelastomer. Specifically, the solvent is added in an amount of from about 25 to about 99 weight percent, preferably from about 70 to about 95 weight percent.

In embodiments, the polyorganosiloxane having functionality according to the present invention has the formula:

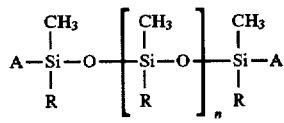

where R is an alkyl from about 1 to about 24 carbons, or an alkenyl of from about 2 to about 24 carbons, or a substituted or unsubstituted aryl of from about 4 to about 18 carbons; A is an aryl of from about 6 to about 24 carbons, a substituted or unsubstituted alkene of from about 2 to about 8 carbons, or a substituted or unsubstituted alkyne of from about 2 to about 8 carbons; and n is from about 2 to about 400, and preferably from about 10 to about 200 in embodiments.

In a preferred embodiment, R is an alkyl, alkenyl or aryl, wherein the alkyl has from about 1 to about 24 carbons, preferably from about 1 to about 12 carbons; the alkenyl has from about 2 to about 24 carbons, preferably from about 2 to about 12 carbons; and the aryl has from about 6 to about 24 carbon atoms, preferably from about 6 to about 18 carbons. R may be a substituted aryl group, wherein the aryl may be substituted with an amino, hydroxy, mercapto or substituted with an alkyl having for example from about 1 to about 24 carbons and preferably from 1 to about 12 carbons, or substituted with an alkenyl having for example from about 2 to about 24 carbons and preferably from about 2 to about 12 carbons. In a preferred embodiment, R is independently selected from methyl, ethyl, and phenyl. The functional group A can be an alkene or alkyne group having from about 2 to about 8 carbon atoms, preferably from about 2 to about 4 carbons, optionally substituted with an alkyl having for example from about 1 to about 12 carbons, and preferably from about 1 to about 12 carbons, or an aryl group having for example from about 6 to about 24 carbons, and preferably from about 6 to about 18 carbons. Functional group A can also be mono-, di-, or trialkoxysilane having from about 1 to about 10 and preferably from about 1 to about 6 carbons in each alkoxy group, hydroxy, or halogen. Preferred alkoxy groups include methoxy, ethoxy, and the like. Preferred halogens include chlorine, bromine and fluorine. A may also be an alkyne of from about 2 to about 8 carbons, optionally substituted with an alkyl of from about 1 to about 24 carbons or aryl of from about 6 to about 24 carbons. The group n is from about 2 to about 400, and in embodiments from about 2 to about 350, and preferably from about 5 to about 100. Furthermore, in a preferred embodiment n is from about 60 to about 80 to provide a sufficient number of reactive groups to graft onto the fluoroelastomer. In the above formula, typical R groups include methyl, ethyl, propyl, octyl, vinyl, allylic crotnyl, phenyl, naphthyl and phenanthryl, and typical substituted aryl groups are substituted in the ortho, meta and para positions with lower alkyl groups having from about 1 to about 15 carbon atoms. Typical alkene and alkenyl functional groups include vinyl, acrylic, crotonic and acetenyl which may typically be substituted with methyl, propyl, butyl, benzyl, tolyl groups, and the like.

The dehydrofluorinating agent which attacks the fluoroelastomer generating unsaturation is selected from the group of strong nucleophilic agents such as peroxides, hydrides, bases, oxides, etc. Examples of strong nucleophilic agents include primary, secondary and tertiary, aliphatic and aromatic amines, where the aliphatic and aromatic amines have from about 2 to about 15 carbon atoms. It also includes aliphatic and aromatic diamines and triamines having from about 2 to about 15 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups such as ethylamino, propylamino and butylamino, with propylamino being preferred.

The amino silane compound in the present invention is used during the preparation of the volume graft polymer. Amino silane can be used as the dehydrofluoroinating agent, in addition to using it as a curative. If an amino silane is added as the dehydrofluorinating agent, the residual amino silane compound in the reaction mixture can also serve as a curative. In this scenerio, no additional curing agent is needed to cure the volume graft. Alternatively, an amino silane can be added as the curing agent after formation of the volume grafted elastomer. In this scenerio, the dehydrofluorinating agent can be an amino silane or can be other than an amino silane. Specifically, the amino silane is of the general formula $NH_2(CH_2)_nNH(CH_2)_mSi[(OR)_t(R')w]$, wherein n and m are numbers of from about 1 to about 20, preferably from about 2 to about 6; t+w=3; R and R' are the same or different and are an aliphatic chain having from about 1 to about 20 carbon atoms, or an aromatic group of from about 4 to about 18 carbons, such as for example in embodiments, benzene, tolyl, xylyl, etc. Examples include 4-aminobutyldimethyl methoxysilane, 4-aminobutyl triethoxysilane, (aminoethylaminomethyl)phenyl triethoxysilane, (aminoethyl aminomethyl) phenyl trimethoxy silane, 3-(N-styrylmethyl-2-aminoethyl aminopropyl) trimethoxy silane available in its hydrochloride form, N-(2-aminoethyl)-3-aminopropylmethyl dimethoxysilane, N-(2-aminoethyl)-3-aminopropyl trimethoxysilane, N-(2-aminoethyl)-3-aminopropyl tris(2-ethyl-hexoxy)silane, N-(6-aminohexyl)aminopropyl-trimethoxysilane, 3-(1-aminopropoxy)-3,3-dimethyl-1-propenyl-trimethoxysilane, 3-aminopropyl tris (methoxyethoxyethoxy)-silane, 3-aminopropyidimethyl ethoxysilane, 3-aminopropylmethyl diethoxysilane, 3-aminopropyl diisopropylethoxysilane, 3-aminopropyl triethoxysilane, 3-aminopropyl trimethoxysilane, 3-Aminopropyltris (trimethylsiloxy)silane. A particularly preferred amino silane useful in the present invention is AO700 (N-(2-aminoethyl)-3-aminopropyl trimethoxysilane), manufactured by Huls of America, Inc.

The amino silane as a curative and/or a dehydrofluorinating agent is present in the reaction mixture in an amount of from about 0.5 to about 10 percent based on the weight of fluoroelastomer. It is preferable that the amino silane be present in an amount of from about 1 to about 5 percent. Specifically preferred amounts are from about 1 to about 2 percent.

It is preferred that the amino silane be used as the dehydrofluorinating agent at the beginning of the process for providing a volume grafted elastomer surface, and that no additional amino silane be added. The amino silane will act as a dehydrofluorinating agent, in addition to the curing agent. However, an additional amount of amino silane can be added after addition of the dehydrofluorinating agent, polymerization initiator and polyorganosiloxane, to act as a further curing agent.

Although the mechanism of reaction by use of the amino silane is not exactly known, the amino compounds act as both a crosslinker and a coupler. Therefore, there is no need for additional couplers and crosslinkers to be added during the curing process. Specifically, the amino silane is an aminoalkyl functional silane, and has an amine functionality at one end and trialkoxysilane at the other. The dual functionality of the amino silane suggests that the amine is chemically bonded to fluoropolymer, allowing the trialkyl silane functionality to bring about a condensation reaction between fluoropolymer molecules under certain conditions. In contrast, the most probable mechanism for VC-50 and other known curatives is that the crosslinking of fluoropolymer chains occurs through a single reactive functionality.

The curing time is from about 30 minutes to about 24 hours, and preferred is from about 1 to about 4 hours, particularly preferred from about 1 to about 2 hours. The temperature for curing is from about 100° to about 150° C., preferably from about 130° to about 150° C.

Typical free radical polymerization initiators for this purpose are peroxides and azonitriles, specifically benzoyl peroxide and azoisobutyronitrile, AIBN. The polymerization initiators are present in the reaction mixture in an amount of from about 1 to about 20 percent, preferably from about 2 to about 10 percent.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, and processing aids. Oxides such as copper oxides may be added in certain amounts to fuser roll coatings to provide sufficient anchoring sites for functional release oils, and thereby allow excellent toner release characteristics from such members.

The fuser member may be a roll, belt, flat surface or other suitable shape used in the fixing of thermoplastic toner images to a suitable substrate. It may take the form of a fuser member, a pressure member or a release agent donor member, preferably in the form of a cylindrical roll.

Typically, the fuser member is made of a hollow cylindrical metal core, such as copper, aluminum, steel, or certain plastic materials chosen to maintain rigidity, structural integrity, as well as being capable of having the silicone elastomer coated thereon and adhered firmly thereto. It is preferred that the supporting substrate is a cylindrical sleeve having an outer layer of from about 1 to about 6 mm. In one embodiment, the core which may be a steel cylinder is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Alternatively, there may be one or more, and preferably up to 10 intermediate layers between the substrate and the outer layer of the cured elastomer if desired. Optional intermediate adhesive layers and/or elastomer layers may be applied to achieve desired properties and performance objectives of the present invention. An adhesive layer may be selected from a polymeric compound, for example, epoxy resins, silanes and polysiloxanes. Preferred adhesives are proprietary materials such as THIXON 403/404, Union Carbide A-1100, Dow TACTIX 740, Dow TACTIX 741, and Dow TACTIX 742. A particularly preferred curative for the aforementioned adhesives is Dow H41. Typical elastomer layers include materials having the appropriate thermal and mechanical properties for such layers such as silicone elastomers, fluoroelastomers, EPDM (ethylene propylene diene monomer) and TEFLON® PFA sleeved rollers. Preferred elastomer layers comprise a haloelastomer or a silicon elastomer.

A silicone elastomer intermediate layer may be applied according to conventional techniques such as injection molding and casting after which it is cured for up to 15 minutes and at 120° to 180° C. to provide a complete cure without a significant post cure operation. This curing operation should be substantially complete to prevent debonding of the silicone elastomer from the core when it is removed from the mold. Thereafter, the surface of the silicone elastomer is sanded to remove the mold release agent and it is wiped clean with a solvent such as isopropyl alcohol to remove all debris. The intermediate layer can also be prepared from fluoroelastomers like VITON GF®, wherein a typical composition is prepared, for example, by adding 30 parts per 100 parts of VITON GF® carbon black like REGAL N991®, followed by rubber mixing in a Banbury Mixer and thereafter, injection molded onto a metal core. Alternatively, the intermediate layer may be formed in accordance with the present invention. The thickness of the intermediate layer is from about 0.5 to about 20 mm, preferably from about 1 to about 5 mm.

The outer layer of the fuser member is preferably prepared by dissolving the fluoroelastomer in a typical solvent, such as methyl ethyl ketone, methyl isobutyl ketone and the like. A nucleophilic dehydrofluorinating agent like an amine, preferably amino silane, is then added in an amount of from about 0.5 to about 10 percent, preferably from about 1 to about 5 percent and more preferably from about 1 to about 5 percent based on the weight of the fluoroelastomer, followed by stirring for 15 to 60 minutes at 45° to 85° C. After this, the polymerization initiator which is generally dissolved in an aromatic solvent such as toluene, is added with continued stirring for 5 to 25 minutes. Subsequently, the polyorganosiloxane is added with stirring for 30 minutes to 10 hours at a temperature of 45° to 85° C. to form a volume grafted elastomer. Optionally, to this resulting homogeneous volume grafted elastomer solution, an optional additional amount of amino silane can be added in an amount of from about 0.5 to about 10 percent, preferably from about 1 to about 5 percent, and particularly preferably from about 1 to about 2 percent based on the weight of fluoroelastomer. The resulting solution is then used to fabricate the outer layer of a fuser member by conventional solution coating methods spraying, dipping, flow coating, or the like. The thickness of the outer layer can vary depending upon specific applications of from about 12.5 to about 125 micrometers thick, but for fuser applications is from about 25 to about 75, preferably from about 35 to about 50 micrometers thick.

This thickness range is selected to provide a layer thin enough to prevent a large thermal barrier for fusing and thick enough to allow a reasonable wear life. While molding, extruding and wrapping techniques are alternative means which may be used, we prefer to spray successive applications of the solvent solution. When the desired thickness of coating is obtained, the coating is cured and thereby bonded to the roll surface.

The present invention greatly reduces the cost and time associated with providing a volume grafted elastomer surface on a supporting substrate. Specifically, the present invention dispenses with the additional costs associated with materials which were previously necessary to effect curing, such as the coupling and crosslinking agents, along with the basic metal oxides. The amino silane functions as both the dehydrofluorinating agent and the curing agent. In addition, a significant cost associated with the curing process is the roll milling and final ball milling step. By dispensing with the need for the roll milling and/or final ball milling step, the present invention saves time as well as expense. The unit manufacturing costs can be reduced substantially with embodiments of the present invention.

In addition to cost reduction and time savings, with embodiments of the present invention there is provided a volume grafted elastomer surface with sufficient chemical, physical and thermal stability, as well as increased toughness.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1
Preparation of Volume Graft Solution

A volume graft was prepared by dissolving 2,500 grams of Viton GF in 25 liters of methylethyl ketone (MEK) by stirring at room temperature (25° C.). This is accomplished by vigorous stirring using a mechanical stirrer. It takes approximately two to four hours to accomplish the dissolution depending upon the intensity of stirring. The stirring proceeds until a color change to clear. The above solution is then transferred to a reaction vessel and 250 ml of the amine dehydrofluorinating agent, 3-(N-styrylmethyl-2-aminoethyl aminopropyl) trimethoxy silane hydrochloride (S-1590, available from Huls of America, Inc. Piscataway, N.J.) was added. The contents of the flask were then stirred using a mechanical stirrer while maintaining the temperature between 55° and 60° C. After stirring for 30 minutes, 500 ml of 100 centistoke vinyl terminated polysiloxane (PS-441) also available from Huls of America, Inc. was added and stirring continued for another ten minutes. A solution of 100 g of benzoyl peroxide in a 1000 ml. mixture of toluene and MEK (80:20) was then added. The stirring as continued while heating the contents of the flask around 55° C. for another 2 hours. During this time the color of the solution turned light yellow which solution was then poured plastic storage bottles.

Example 2

(Comparative Example)
Curing of Volume Graft With Standard Curative (VC-50)

A free standing film of the volume graft was prepared from the above solution by the following method. An amount of 500 g of volume graft solution from Example 1 was added to a milling jar with milling media. 2.5 g of DuPont Curative VC-50 catalyst crosslinker in 22.5 parts of methyl ethyl ketone, 1.1 g of calcium hydroxide, 2.2 g of magnesium oxide, were added to the above jar. The contents of the jar were then ball milled for 17 to 24 hours. Following ball milling the resulting mixture was then air sprayed on to aluminum substrate by conventional spraying method and air dried for 24 hours. The film was then subjected to standard step heat curing procedure, 2 hours at 93° C., 2 hours at 149° C., 2 hours at 177° C., and 16 hours at 208° C. The cured film after removal from the aluminum substrate was subjected to mechanical property determination and heat aging. The heat aging was achieved by keeping the film in an oven at 400° F., in air atmosphere. The mechanical properties were determined by an Instron Tensile Testing Machine before and after heat aging. The changes in the mechanical properties on heat aging were observed and are listed in the following table. The table describes what the sample is thickness of the dry cured film, toughness in in-lb/in$^3$, which is an indication of the wear resistance, percent elongation and tensile strength in psi. The above film was 13.3 mil thick, had a toughness of 1,317 in-lb/In$^3$, an elongation of 365 percent, and a tensile strength of 770 psi. On heat aging for 7 days in air at 400° F. the toughness dropped to 1,213 in-lb/In$^3$, elongation increased to 376 percent, and tensile strength was lowered to 692 psi.

Example 3
Curing of Volume Graft With Aminosilanes

A free standing film of the volume graft using aminosilane was prepared from the above solution as follows. To 500 g of the volume graft from Example No. 1, 5 g of N-(2-aminoethyl-3 aminopropyl)-trimethoxy silane (AO700, available from Huls of America, Inc. Piscataway, N.J.), was added. The solution was mixed for a few minutes with the help of a mechanical stirrer and was then air sprayed on to aluminum substrate by conventional spraying method and air dried for 24 hours. The film was then subjected to standard step heat curing procedure, 2 hours at 93° C., 2 hours at 149° C., 2 hours at 177° C., and 16 hours at 208° C. The cured film after removal from the aluminum substrate was subjected to mechanical property determination and heat aging. The heat aging was achieved by keeping the film in an oven at 400° F., in air atmosphere. The mechanical properties were determined by Instran before and after heat aging. The changes in the mechanical properties on heat aging were observed and are listed in the following Table I. Table I describes what the sample is, thickness of the dry cured film, toughness in in-lb/In$^3$, which is an indication of the wear resistance, percent elongation and tensile strength in psi. The above film was 14.4 mil thick, had the toughness of 3514 in-lb/In$^3$, elongation of 723 percent, and tensile strength of 1407 psi. On heat aging for 7 days in air at 400° F. the toughness dropped to 3175 in-lb/In$^3$, elongation increased to 736 percent, and tensile strength was lowered to 1207 psi. It is apparent from the results set forth in Table I that volume graft with amino silanes of the present invention have superior mechanical properties as compared to standard curing methodologies.

TABLE I

Volume Graft Curing and Aging Studies VC-50 vs. A0700

| Sample Description | Toughness In-lb/in³ | Film Thickness (mil) | Elongation (%) | Tensile Strength (psi) |
|---|---|---|---|---|
| Volume Graft + A0700 | 3514 | 14.4 | 723 | 1407 |
| Volume Graft + A0700 (7 days at 400° F.) | 3176 | 14.4 | 736 | 1207 |
| Volume Graft + VC-50 + Oxides | 1317 | 13.3 | 365 | 770 |
| Volume Graft + VC-50 + Oxides (7 days at 400° F.) | 1213 | 13.3 | 376 | 692 |

Example 4

(Comparative Example)

For comparative purposes, two plain silicone elastomer donor rolls were made from a primed core having a coating of Dow Corning Liquid Silicone Rubber 590 to a thickness of 0.25 inches. One of these rolls was overcoated with the volume graft cured with conventional curative VC-50 according to the teachings of Example 2, whereas the second roll was overcoated with volume graft using curative N-(2-aminoethyl-3 aminopropyl)-trimethoxy silane (A0700, available from Huls of America, Inc. Piscataway, N.J.). The thickness of the cured volume graft was maintained in both cases to be 1.0 mils. Both these rolls were used as release agent donor rolls for supplying conventional silicone oil release agent in a Xerox 5090 test fixture. The roll overcoated with VC-50 cured volume graft started showing gel deposits after 3 million prints after which time test was terminated, whereas the roll overcoated with the N-(2-aminoethyl-3 aminopropyl)-trimethoxy silane showed no signs of such gel deposits demonstrating superior performance. The test was terminated without failure. Both donor rolls showed excellent oil transportability, no toner contamination and no sign of physical or chemical degradation. Furthermore, the toner used in the test contained distearyl dimethyl ammonia methyl sulfate (DDAMS), as described in U.S. Pat. No. 4,560,635, a charge enhancing additive which is known to produce hardening of the roll surfaces and subsequent oxidation, produced increased surface energy and irregular wearing of the roll surfaces. This charge enhancing additive appeared to have no affect on the donor roll surfaces prepared in accordance with the present invention.

The above examples along with the results shown in Table I demonstrate the increased chemical, physical and thermal stability along with sufficient toughness of the volume grafted elastomers produced by the method in accordance with the present invention. Thus, according to the present invention, a long life fuser member has been provided which is capable of use as a donor roll in a fusing system which require the use of functional or non functional release agent.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A method for providing a volume grafted elastomer surface on a supporting substrate consisting essentially of in sequential order:

a) dissolving a fluoroelastomer;

b) adding an amino silane as a dehydrofluorinating agent and curing agent in an amount of from about 0.5 to about 10 weight percent based on the weight of fluoroelastomer;

c) adding a polymerization initiator, a polyorganosiloxane and adding an additional amount of amino silane to form a homogeneous volume graft polymer; and d) subsequently providing at least one layer of the homogeneous volume grafted elastomer solution to said supporting substrate.

2. A method in accordance with claim 1, wherein said homogeneous volume grafted elastomer solution provided on said supporting substrate is heat cured.

3. A method in accordance with claim 1, wherein the amino silane is of the formula $NH_2(CH_2)_nNH(CH_2)_mSi[(OR)_t(R')_w]$, wherein n and m are numbers of from about 1 to about 20; t+w=3; and R and R' are an aliphatic hydrocarbon chain having from about 1 to about 20 carbon atoms or an aromatic group having from about 4 to about 18 carbons.

4. A method in accordance with claim 3, wherein the amino silane is selected from the group consisting of N-(2-aminoethyl-3-aminopropyl)-trimethoxy silane, 3-(N-styrylmethyl-2-aminoethyl aminopropyl) trimethoxy silane (aminoethyl aminomethyl) phenyl trimethoxy silane and (aminoethyl aminomethyl) phenyl triethoxy silane.

5. A method in accordance with claim 1, wherein the amount of amino silane is from about 1 to about 5 weight percent.

6. A method in accordance with claim 5, wherein the amount of amino silane is from about 1 to about 2 weight percent.

7. A method in accordance with claim 1, wherein the polyorganosiloxane has the following formula:

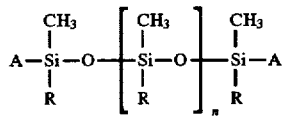

where R is selected from the group consisting of an alkyl of from about 1 to about 24 carbons, an alkenyl of from about 2 to about 24 carbons, and a substituted or unsubstituted aryl of from about 6 to about 24 carbons; A is selected from the group consisting of an aryl of from about 6 to about 24 carbons, a substituted or unsubstituted alkene of from about 2 to about 8 carbons, and a substituted or unsubstituted alkyne of from about 2 to about 8 carbons; and n is from about 2 to about 400.

8. A method in accordance with claim 1, wherein the fluoroelastomer is selected from the group consisting of poly(vinylidene fluoride-hexafluoropropylene) and poly(vinylidene fluoride-hexafluoropropylene-tetrafluoroethylene).

9. A method in accordance with claim 1, wherein the polymerization initiator is selected from the group consisting of peroxides and azonitriles.

10. A method in accordance with claim 1, wherein said fluoroelastomer is dissolved in a solvent selected from the group consisting of methyl ethyl ketone and methyl isobutyl ketone.

11. A method for providing a volume grafted elastomer surface on a supporting substrate consisting essentially of in sequential order:

a) dissolving a fluoroelastomer;

b) adding a dehydrofluorinating agent, a polymerization initiator and a polyorganosiloxane;

c) adding and reacting an amino silane in an amount of from about 0.5 to about 10 percent to effect curing, thereby forming a homogeneous volume grafted elastomer; and d) subsequently providing at least one layer of the homogeneous volume grafted elastomer solution to said supporting substrate.

12. A method in accordance with claim 11, wherein the dehydrofluorinating agent is selected from the group consisting of a) primary, secondary and tertiary aliphatic and aromatic amines where the aliphatic and aromatic groups have from about 2 to about 15 carbon atoms, and b) aliphatic and aromatic diamines and triamines having from about 2 to about 15 carbon atoms.

13. A method in accordance with claim 12, wherein the dehydrofluorinating agent is selected from the group consisting of N-(2-aminoethyl-3-aminopropyl)-trimethoxy silane, 3-(N-styrylmethyl-2-aminoethyl aminopropyl) trimethoxy silane (aminoethyl aminomethyl) phenyl trimethoxy silane and (aminoethyl aminomethyl) phenyl triethoxy silane.

14. A method for providing a volume grafted elastomer surface on a supporting substrate consisting essential of in sequential order:

a) dissolving a fluoroelastomer;

b) adding an amino silane of the following formula $NH_2(CH_2)_n NH(CH_2)_m Si[(OR)_t(R')_w]$, wherein n and m are numbers of from about 1 to about 20; t+w=3; and R and R' are an aliphatic hydrocarbon chain having from about 1 to about 20 carbon atoms or an aromatic group having from about 4 to about 18 carbons, as a dehydrofluorinating agent and curing agent in an amount of from about 0.5 to about 10 weight percent based on the weight of fluoroelastomer;

c) adding a polymerization initiator, a polyorganosiloxane and adding an additional amount of amino silane of the above formula to form a homogeneous volume graft polymer; and d) subsequently providing at least one layer of the homogeneous volume grafted elastomer solution to said supporting substrate.

15. A method for providing a volume grafted elastomer surface on a supporting substrate consisting essentially of in sequential order:

a) dissolving a fluoroelastomer;

b) adding a dehydrofluorinating agent, a polymerization initiator and a polyorganosiloxane;

c) adding and reacting an amino silane of the following formula $NH_2(CH_2)_n NH(CH_2)_m Si[(OR)_t(R')_w]$, wherein n and m are numbers of from about 1 to about 20; t+w=3; and R and R' are an aliphatic hydrocarbon chain having from about 1 to about 20 carbon atoms or an aromatic group having from about 4 to about 18 carbons, in an amount of from about 0.5 to about 10 percent to effect curing, thereby forming a homogeneous volume grafted elastomer; and d) subsequently providing at least one layer of the homogeneous volume grafted elastomer solution to said supporting substrate.

* * * * *